D. BUSHBY.
STOOKING MACHINE.
APPLICATION FILED AUG. 29, 1917.

1,254,202.

Patented Jan. 22, 1918.
6 SHEETS—SHEET 1.

FIG. 1.

INVENTOR
DAVID BUSHBY
BY W.S. Babcock
ATTY

D. BUSHBY.
STOOKING MACHINE.
APPLICATION FILED AUG. 29, 1917.

1,254,202.

Patented Jan. 22, 1918.
6 SHEETS—SHEET 2.

FIG. 2.

INVENTOR
DAVID BUSHBY
By W. S. Babcock
ATTY

UNITED STATES PATENT OFFICE.

DAVID BUSHBY, OF KEDDLESTON, SASKATCHEWAN, CANADA.

STOOKING-MACHINE.

1,254,202.  Specification of Letters Patent.  Patented Jan. 22, 1918.

Application filed August 29, 1917. Serial No. 188,866.

*To all whom it may concern:*

Be it known that I, DAVID BUSHBY, a subject of the King of Great Britain, residing at Long Lake Farm, Keddleston, Saskatchewan, Canada, have invented new and useful Improvements in Stooking-Machines, of which the following is a specification.

The invention to be hereinafter described relates to stooking machines.

In order to more clearly disclose the construction, operation, and use, of the invention reference should be had to the accompanying drawings forming part of this application. Throughout the several figures of the drawings like reference characters designate the same parts.

The main objects of the invention are to provide a simple, efficient, compact, and durable machine which will automatically form stooks and place them firmly in upright position on the ground.

Referring to the drawings in detail, 1 indicates a U shaped frame opening rearwardly and having a sheaf supporting plate or base 2 extending about one half of its length. This frame is mounted on three swiveled trail wheels 3 and a bull or drive wheel 4. The rear wheels 3 are swiveled in brackets or plates 5 extending laterally so that these wheels will, at all times, be completely free of the path of the stook, as will later appear. The bull wheel 4 is fixed to a shaft 6 journaled in the frame 1 and provided with a gear 7 which meshes with and drives a gear 8 fixed to a second shaft 9 journaled in frame 1. Near the opposite ends this shaft 9 has clutches 10 and 11 keyed to it. Clutches 10 and 11 are adapted to be engaged by clutches 12 and 13, respectively. Clutches 12 and 13 are carried by and drive drums 14 and 15, which are slidably and rotatably mounted on the shaft 9 and are provided with collars 16 and 17 adapted to be engaged by the forked plates 18 and 19 extending from a head 20, slidable on the shaft 6. Consequently, movement of the head 20 in one direction or the other, will cause engagement of one set of clutch elements and disengagement of the other. This in turn, will drive one drum while permitting the other to run free.

On the frame 1 is slidably mounted a carriage 21, by means of slips 22 which extend about and slidably receive the longitudinal members of frame 1. To the opposite sides of the carriage are secured the ends of cords or cables 23. These cables pass rearwardly around guide pulleys or rollers 24 back around the forward guide pulleys or rollers 25 and 26 and are made fast to the drum 14, so that winding in of the drum 14 will cause a rearward travel of the carriage. For returning the carriage, a cable 27 connected to drum 15 is used, branches 28 connecting it to the forward end of the carriage, so that there will be no binding or twisting.

Figures 5, 7, 9:
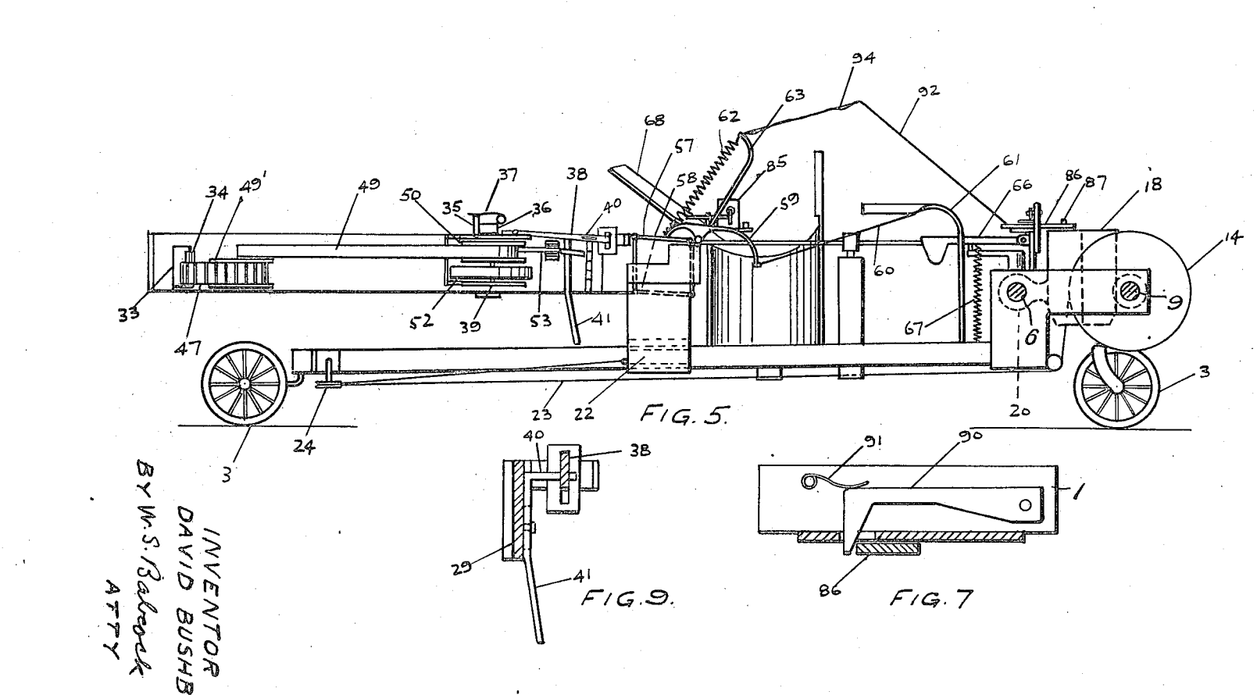
Fig. 5 is a vertical cross section on line 5—5 of Fig. 3.
Fig. 7 is an enlarged detail view, on line 7—7 of Fig. 1 of the dog 90 and lever 86, hereinafter described, in locking position, with certain proximate parts, partly sectioned and partly in elevation.
Fig. 9 is an enlarged detail view, on line 9—9 of Fig. 3 partly in section and partly in elevation, of bar 41, hereinafter described, a part of rigid stook-forming frame 29 and said lever arm 38 resting on said bar.
Figure 6:
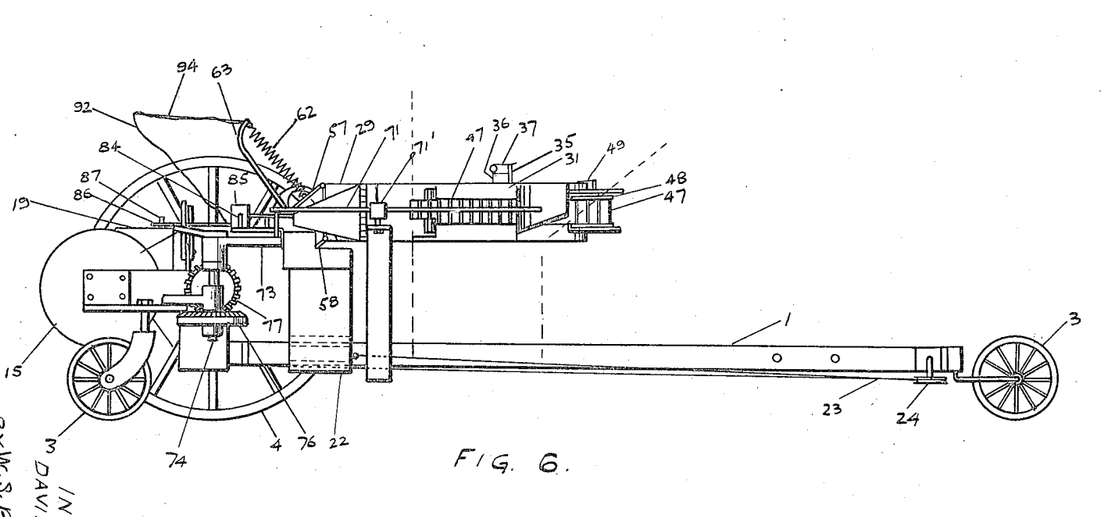
Fig. 6 is a left hand side elevation of Fig. 2, with sheaf basket in dotted lines.

Within the carriage is a stooker frame comprising a rigid substantially semi-circular frame member 29 with an outwardly and forwardly curved and slotted sheaf guiding end 30. To a point near the opposite end of this fixed frame member is hinged a swinging frame member 31 having a rearwardly and outwardly curved end 32 and being provided with a vertical slot 33 near that end best seen in Fig. 5, and an anti-friction guide roller 34 in said slot, for a purpose to be later disclosed. The swinging frame member is held in operative or stook forming position by means of a catch 35 pivotally mounted on a plate or bracket 36 and kept, normally, in operative position by a leaf spring 37. Plate 36 and catch 35 are carried by the fixed frame member and the catch engages the swinging member, thereby holding it in position. The lower edge of the catch 35 rests upon a lever arm 38, which is pivoted at one end to a top plate or bracket 39, which is carried by the swinging frame member and which forms part of a spring housing, as will later appear. The opposite or free end of lever 38 rests upon the horizontal arm 40 of a bar 41 vertically slidably mounted on the fixed frame member by means of a pin 42 and slot 43.

In order to swing the hinged frame member clear of the path of the deposited stook, a spring 44 is provided, connected at its opposite ends, respectively, to a plate 45 on the fixed frame member and a stop arm 64 on the swinging frame member.

Within the stooker frame is a compression belt 47 of any suitable flexible material and construction. One end is fixed to the sheaf receiving end of the fixed frame member and it is carried across and through the slot 33, about roller 34, and is wound upon and secured to a winding rod, shaft, or drum 48 journaled in the plates 49' carried by the free end of the swinging frame member 31. To the winding shaft 48 is also secured and wound thereon, a tension band 49, the opposite end of which is connected to a drum 50 which is driven by a clock spring 52, all mounted between the plates 39 carried on the swinging frame 31. Thus, the tendency of the spring 52 is, always, to draw in the tension band 49 and wind up the compression belt 47. This, of course, keeps the compressor belt under tension. But, this tension is necessary only during the making of the stook, as will later appear. The belt should not be under tension during setting of the stook. If it were, it would throw the stook over, rearwardly, as the swinging frame member opens. So, to overcome the effect of spring 52, at this stage, a brake is used, comprising a lever 53 fulcrumed in ears 54 on the member 31 and having one end bearing on the drum 50 and band 49 wound thereon, and the opposite end in position to be engaged and actuated by a trip pin 54' extending from the fixed frame member 29 through an opening in the overlapping part of the movable frame member 31. At this point a bracket 95 extends outwardly from the fixed frame member 29 beneath the edge of the swinging member, when closed, to give additional support. At the fulcrum point of lever 53, a branch 55 provides leverage for a spring 56 one end of which is connected thereto. The opposite end of the spring is adjustably connected to a notched plate 57' extending from the swinging member 31. Thus, tension spring 56, through the brake lever 53 acts on drum 50 and stops further tension on the compressor belt, as the swinging member 31 moves to open position. But, as the swinging member 31 is returned to closed or stook building position, the trip pin 54' will engage the brake lever and move it to inoperative position, free of the drum 50, so that spring 52 immediately takes up the slack of the compressor belt 47, and keeps it under tension as the stook is being built.

As the carriage 21 reaches the end of its travel and the frame member 31 is swung open, the entire frame (31 and 29) is dropped, vertically, to set the stook firmly. This is made possible by the parallel hinge plates 57 and 58, connecting the frame member 29 with the carriage 21—see Fig. 5. To accomplish this movement, a lever 59 is used, fulcrumed on the carriage 21 in such position as to have one end in engagement with the upper hinge plate 57. The opposite end is connected, by a cord or cable 60 to a post 61 on the frame 1. Thus, as the cord 60 is drawn taut, the lever operates to force the frame down, against the tension of a spring 62 connected at its opposite ends, respectively, to hinge plate 57 and a post 63 on the carriage 21.

It is necessary of course, to swing the frame member 31 to closed or operative position, as the carriage reaches the forward end of frame 1. For this purpose, an arm 64 (see Fig. 1) is provided on the rear part of the frame member 31 and so arranged as to be engaged by a stop 65, just as the carriage is reaching the limit of its forward travel. As the closing is thus completed, a locking dog 66 drops into place over the forward bar of the carriage and secures it in place during the stook forming operations. This dog is pivoted to the main frame 1, and is actuated by a spring 67. Its locking end is beveled both forwardly and rearwardly so that it will be raised to drop into position over the front bar of the carriage and by engagement therewith hold it. And the bevel of the opposite face is such as to permit the carriage to free itself as soon as the force exerted by the drum 14 reaches a predetermined point.

As the sheaves are delivered from the binder by the kicker, they fall, one at a time, onto an inclined plate 68 which guides them and turns them, but first, into the bottom of a sheaf basket 69, a spring rod 70 assisting in the turning movement. Thus, as they come into the basket they will be standing upright or vertical, or nearly so. Here they are engaged by the curved end of a feeder arm 71 which end has a circular movement across the basket toward the opening between the ends of the stooker frame members, to engage sheaves and force them from the basket into the stooker frame. This motion is imparted by a rotatable block 71' supported on a bracket 72 and through which block the feeder arm 71 slides. The opposite end of the arm is pivoted to a crank arm 73 of a stub shaft 74 journaled in a bracket 75 on the main frame 1 and carrying a bevel gear 76 driven from a bevel pinion 77 on shaft 9.

Figure 2:
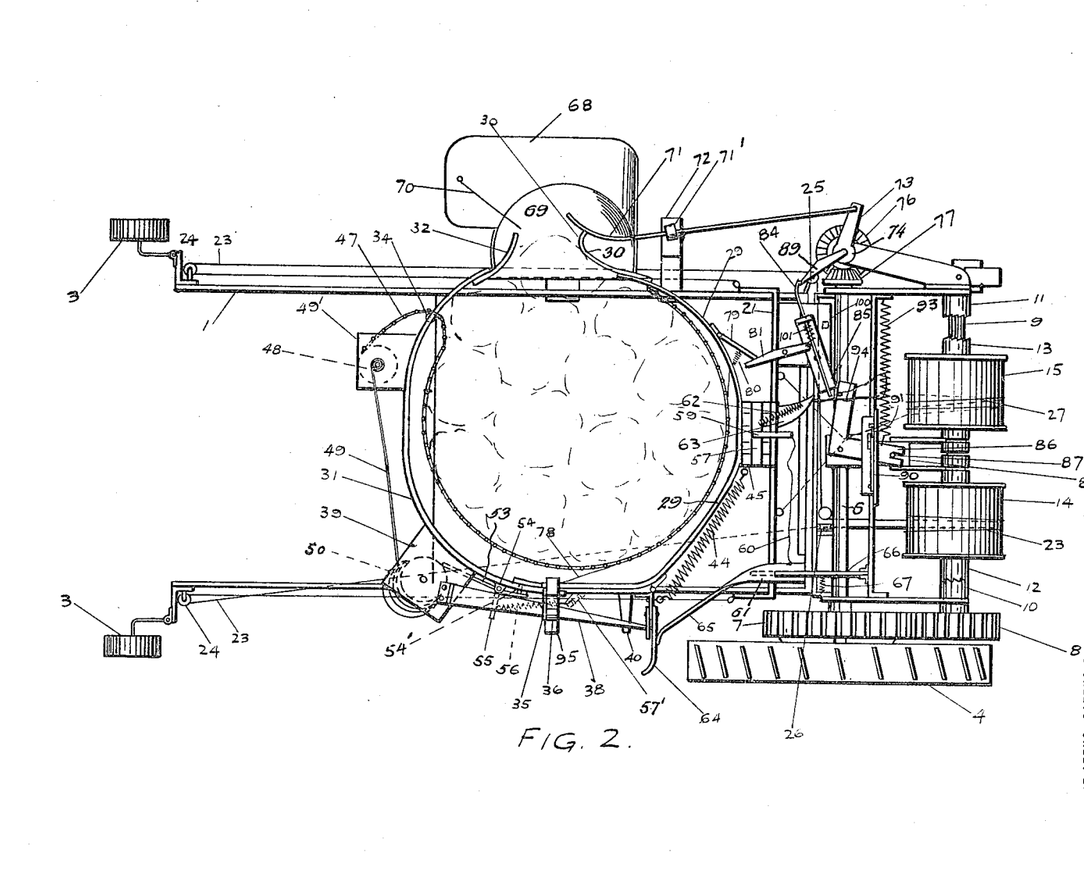
Fig. 2 is a like view in stook completing position.
Figure 3:
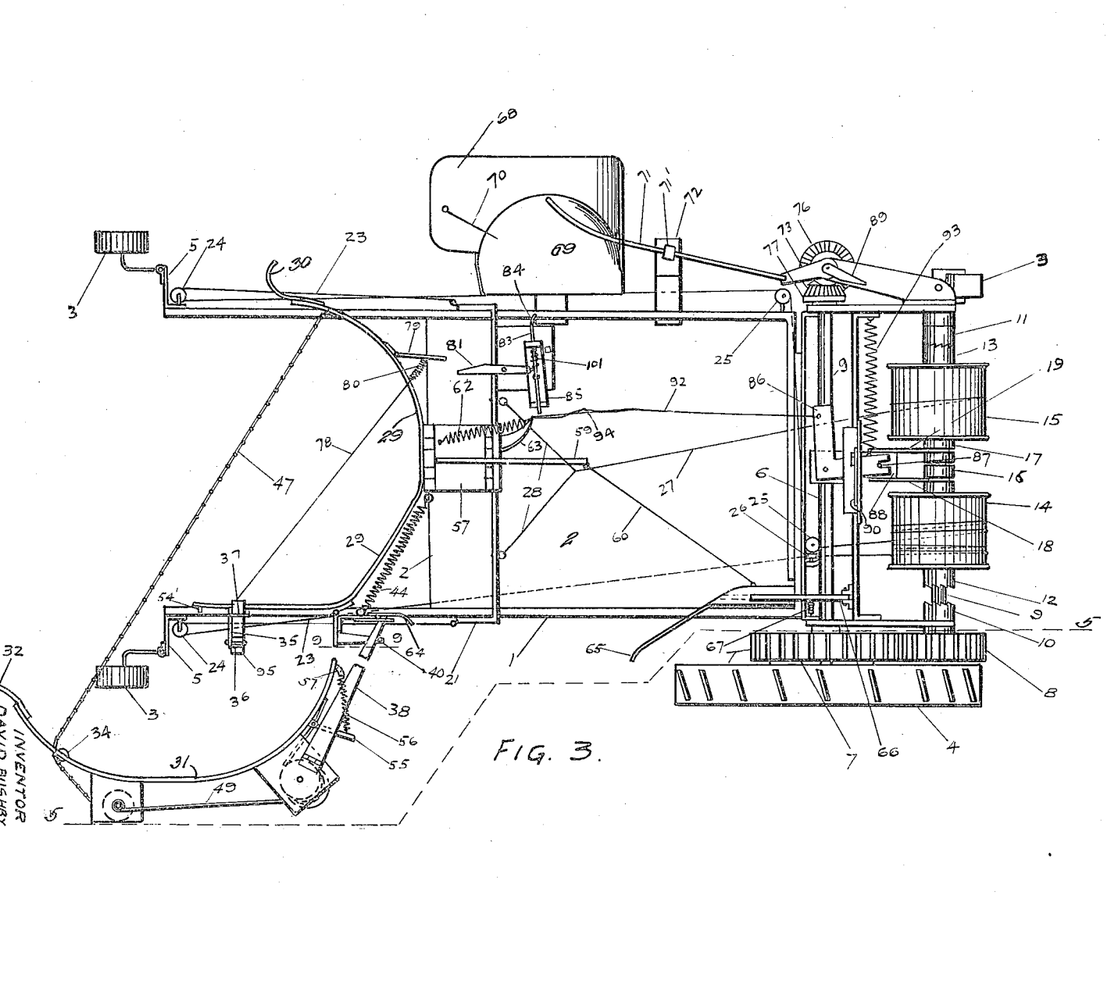
Fig. 3 is a like view in stook depositing position.
Figures 4, 8, 10:
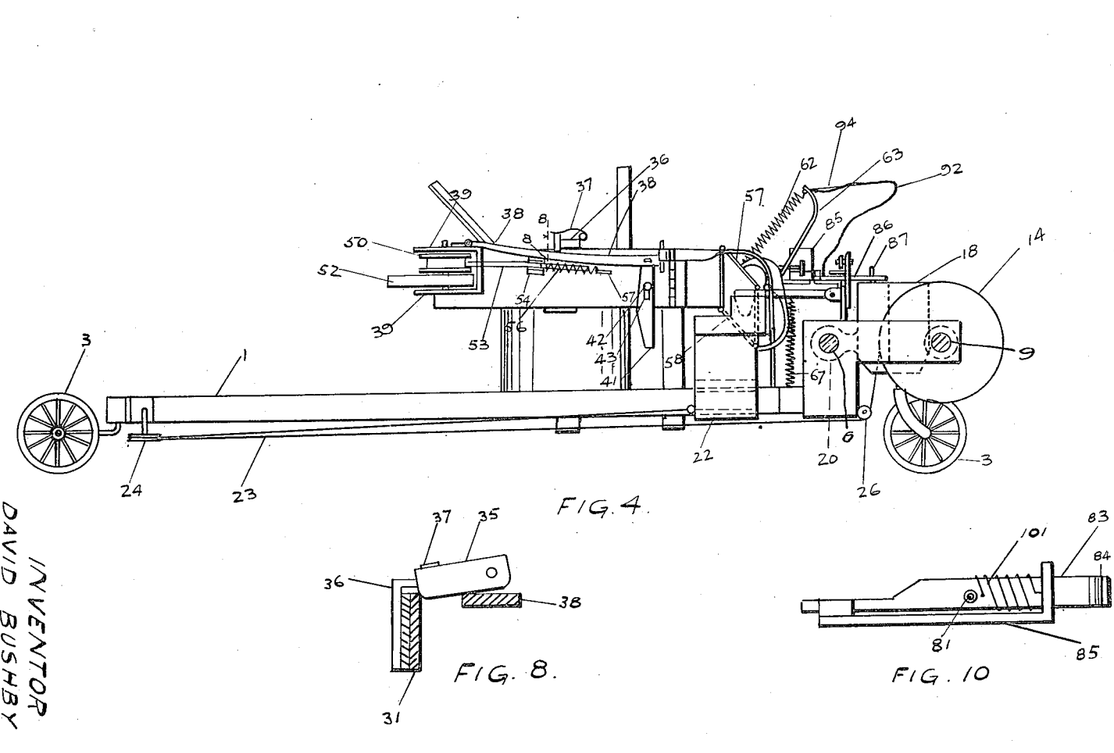
Fig. 4 is a vertical cross section on line 4—4 of Fig. 1.
Fig. 8 is an enlarged detail view, on line 8—8 of Fig. 4, of bracket 36, catch 35, leaf spring 37, lever arm 38 and a portion of the movable member of the stook-forming frame, all as hereinafter described, partly shown in section and partly in elevation.
Fig. 10 is an enlarged detail of bracket 85 and coöperating parts.

As the last sheaf of the stook is forced into the frame 29—31, a cord or cable 78 will reach its maximum inward movement as shown in Fig. 2. At one end, this cable is secured to the fixed frame member and at the opposite end it is passed through a hole therein and secured to a trip plate 79 hinged to the fixed frame member. A coil spring 80 is disposed about the cord between the hinged trip plate 79 and the fixed frame member 29, acting to hold the plate inoperative, except as the stook is being completed. As the plate 79 is forced forward toward the fixed frame member, it will engage the free end of a lever 81 fulcrumed on a small plate or bracket 82. The opposite end of this lever is loosely connected to a plate 83 (see Fig. 10) provided with a hooked outer end 84 and having a limited sliding movement in a small bracket 85, which is pivoted on the plate 82 in such position that it may engage one end of an elbow lever 86, the opposite end of which is forked or notched to engage a pin 87, in the block 88 carried by the plates 18 and 19 of head 20. Such engagement forces the engagement of the clutches for moving the carriage to stook setting position, and simultaneous disengagement of the other clutches. The pivotal movement of bracket 85 is limited, in one direction, by a stop 100, for a purpose to be later disclosed.

To cause this rocking movement of the bracket 85, a finger 89 is fixed to and rotates with the stub shaft 74. So, as the plate 83 is projected, it will be engaged by the finger 89, causing the momentary rocking of the bracket. As finger 89 escapes from the curved end 84, spring 101 will return plate 83.

As the lever 86 completes its movement, as above stated, a dog 90 (see Fig. 7) pivoted on the frame 1, will drop into locking position and will be yieldingly retained there by a spring 91, keeping the clutches engaged. This will cause the rearward travel of the carriage and stooker frame. As the carriage reaches its rear limit, it will draw taut the cord or cable 92 which is fastened at one end to the post 63 and at its opposite end to the lever 86. This will pull hard enough on the lever to cause it to force the dog 90 up and become disengaged. Then spring 93 will force the clutches and drums in the opposite direction, disengaging the set previously engaged and engaging those previously disengaged. The result is a return of the carriage and stooker frame to the sheaf receiving position. Spring 93 is connected, at its opposite ends to frame 1 and lever 86, of course.

To avoid entanglement of cable 92, as the carriage returns, a spring arm 94 is used, extending from the upper end of post 63 and connected to the cable.

Figure 1:
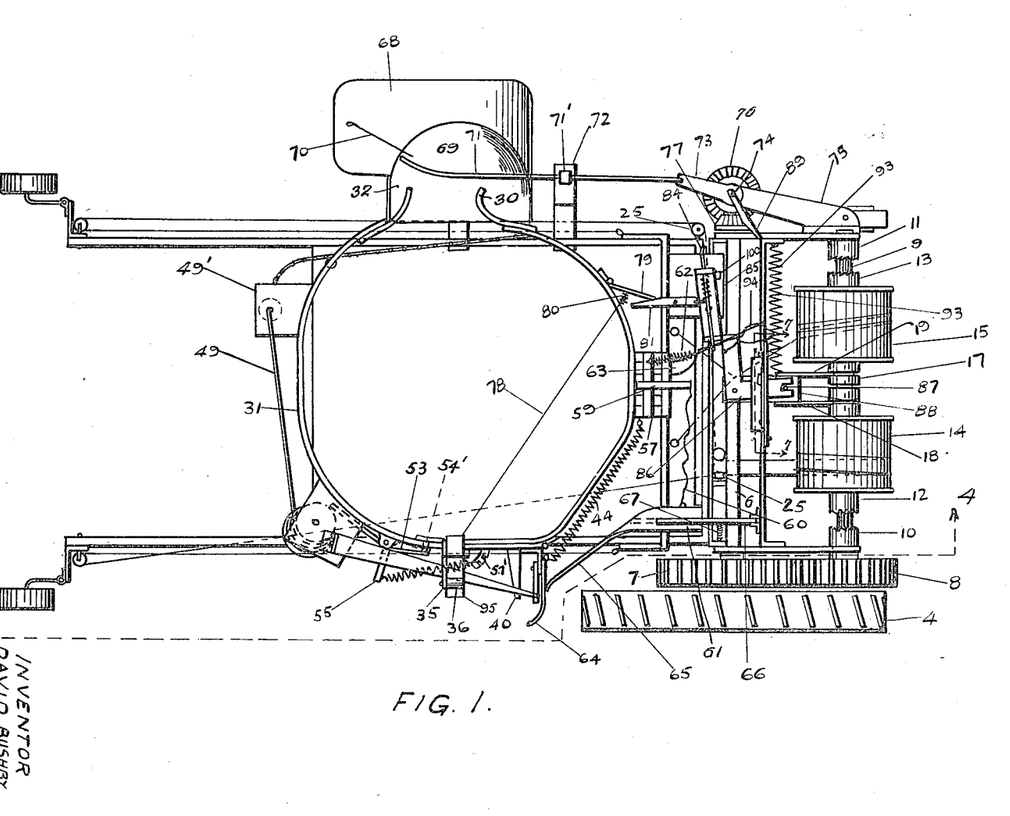
Figure 1 is a top plan view in sheaf receiving position.

The operation of the machine is as follows:—With all the parts as in Fig. 1, the first operations are started by the forward travel of the machine. A sheaf is first thrown on the plate 68, either by hand or by the kicker of a binder, and slides down to a vertical position standing on the bottom of the basket. Then, as the machine starts forward, the bull wheel and its connections operate the feeding arm 71 which engages the sheaf and forces it laterally from the basket across the main frame 1 and bottom plate 2, between the outwardly curved ends of the stooker frame members and against the compressor belt 47. This forces the belt back to make room for the sheaf. The brake lever 53, in this position, is held inoperative by trip pin 54, allowing spring 50 to exert its full force on the compressor belt which, however, is not sufficient to force the sheaf back through the curved ends of the stooker frame. This feeding of the sheaves is repeated as the machine travels forward, until the stooker frame is completely filled and firmly packed with sheaves, the compressing action of belt 47 insuring the firmness of the stook. As the last sheaf is forced into the stooker frame, the cord or cable 78 will be drawn to the position of Fig. 2, swinging plate 79 to engagement with lever 81. This rocks lever 81, which slides the plate 83 into the path of finger 89 which engages it and thereby swings bracket 85, causing engagement of the clutch elements 10 and 12 and consequent driving of drum 14, all as clearly shown in Fig. 2. At the same time, of course, clutch elements 11 and 13 are disengaged, allowing drum 15 to run free. As clutch elements 10 and 12 become engaged, drum 14 is driven, winding in the cables 23 which draws carriage 21 rearwardly, disengaging it from the dog 66, at the start of this rearward travel. During this rearward travel, the spring pressed dog 90, which has dropped behind the edge of lever 86, maintains the lever in such position as to keep the clutch elements 10 and 12 engaged.

As the carriage reaches the rearward limit of its travel, the cable 60 will be drawn taut and the lever 59 will be rocked, forcing the stooker frame vertically downward, against the tension of the spring 62. As the stooker frame drops, bar 41 is engaged by frame 1. Continued downward movement of the stooker frame causes bar 41 to raise lever 38 and rock the catch 35 upward against the tension of spring 37, freeing the swinging frame member 31, which is instantly swung open by the spring 44, and clear of the path of the stook. As it swings open, the brake 53 leaves the trip pin 54 and comes into operation on the drum 50 to stop the tension on the compressor belt. The dropping, opening, and braking are successive but so close as to be almost simultaneous, and the rearward travel of the carriage is so quick and for so short a distance as to require practically no time for the stook to be supported by the frame members and belt before depositing. As these movements are completed, the cable 92 is drawn taut, forcing lever 86 to become disengaged from the dog 90. Spring 93 immediately operates lever 86 to disengage clutch elements 10 and 12, and engage clutch elements 11 and 13. This allows drum 14 to run free and drives drum 15, which winds in cable 27 and returns carriage 21 to the forward position again. At the instant that the return starts, cables 60 and 92 slack, and spring 62 raises the stooker frame. As the carriage returns, bracket 85 will engage lever 86 and force it to the neutral position of Fig. 1, where both sets of clutch elements are disengaged. The limit stop 100, permits the bracket 85 to operate in this way, as will be clear on reference to Fig. 1. At the same time, dog 66 rides over the edge of the carriage bar and drops into holding position, and the stop 65 engages the arm 64 and forces the swinging member 31 to closed or operative position. As the swinging member reaches the closed position, its edge forces up the catch 35, which drops into locking position behind it. At the same instant, the trip pin 54 releases the brake 53, which permits the spring 52 to draw in the slack of the compressor belt under tension for the next stook.

It will be clear that this machine is a complete, self contained and independent machine capable of complete stooking operations either entirely separate from a binder or in combination with a binder, as desired. When used separately, the sheaves may be fed into the basket either by hand or otherwise. When used in combination with a binder, which is the preferred way, any suitable connections may be used between the frame 1 and the binder, provided that each is allowed enough vertical play relatively to the other to overcome the inequalities of the field, so that the vertical movements of one do not compel corresponding movements of the other. Of course, the connections would be so disposed as to bring the sheaf basket into position to receive sheaves direct from the kicker. Such connections are so obvious to those skilled in the art as not to require any special illustration or detailed disclosure.

It is thought that the construction, arrangement, operation, and use of the invention will be clear from the preceding detailed description. Changes may be made in the construction, arrangement, and disposition of the several parts of the invention without in any way departing from the field and scope of the invention, and it is meant to include all such within this application, wherein only a preferred form has been set forth, by way of illustration.

Having thus described my invention, what I claim and desire to protect by Letters Patent is:—

1. In combination in a stooking machine, a supporting frame, a sheaf receiving basket mounted thereon, a carriage reciprocable on said frame, means for reciprocating said carriage, a stooker frame mounted in said carriage and consisting of a fixed section and a section adapted to open and close, a spring acting to open this latter section, means for preventing the action of said spring, means for releasing said opening member, to be actuated by said spring, means for delivering sheaves from said basket to said stooker frame, and means for operating said stooker frame to deposit a stook therefrom.

2. In combination in a stooking machine, a supporting frame, a sheaf receiving basket mounted thereon, a carriage reciprocable on said frame, means for reciprocating said carriage, a stooker frame mounted in said carriage, and having on one side a sheaf receiving opening, means for delivering sheaves from said basket to said stooker frame, a compression band under tension arranged behind said opening within said stooker frame for compressing the sheaves, and means for operating said stooker frame to deposit a stook therefrom.

3. In combination in a stooking machine, a supporting frame, a sheaf receiving basket mounted thereon, a carriage reciprocable on said frame, means for reciprocating said carriage, a stooker frame mounted in said carriage and comprising a fixed frame member and a frame member movable relatively thereto, means for retaining said movable member in operative position, means for releasing said retaining means, means for moving said movable member to inoperative position, and means for delivering sheaves from said basket to said stooker frame.

4. In combination in a stooking machine, a supporting frame, a sheaf receiving basket mounted thereon, a carriage reciprocable on said frame, means for reciprocating said carriage, a stooker frame, mounted in said carriage and comprising a fixed frame member and a frame member movable relatively thereto, a spring-pressed catch connected to said fixed member and engaging said movable member to hold it in closed and operative position, a lever arm pivoted on said movable member and in contact with said catch, a device slidably mounted on said fixed member and supporting the other end of said lever arm and a fixed part arranged for contact with said slidable device for actuating said lever arm and catch to free said movable member, means for moving said movable member to inoperative position, means for returning said movable member to operative position, and means for delivering sheaves from said basket to said stooker frame.

5. In combination in a stooking machine, a supporting frame, a sheaf receiving basket mounted thereon, a carriage reciprocable on said frame, means for reciprocating said carriage, a stooking frame mounted in said carriage and comprising a fixed frame member and a frame member movable relatively thereto, a catch carried by said fixed member and engaging said movable member to hold it closed, a lever arm in contact with said catch, a vertically movable device carried by said frame, a fixed part arranged for contact with said device to operate said lever arm and catch for freeing said movable member, means for moving said movable member to inoperative position, means for moving said stooker frame vertically downward relatively to said carriage, and means for delivering sheaves from said basket to said stooker frame.

6. In combination in a stooking machine, a supporting frame, a sheaf receiving basket mounted thereon, a carriage reciprocable on said frame, means for reciprocating said carriage, a stooking frame mounted in said carriage and comprising a fixed frame member and a frame member movable relatively thereto, means for retaining said movable member in operative position, means for releasing said retaining means, means for moving said movable member to inoperative position, hinged plates connecting said carriage to the fixed member of said frame allowing the descent of the latter, a lever on said carriage engaging one of said plates, a flexible connection from said lever to a fixed point for actuating said lever to force said frame down at a certain point of its horizontal travel and a replacing spring connecting one of said hinge plates to a fixed point for raising said frame when freed from the pull of said flexible connection, and means for delivering sheaves from said basket to said stooker frame.

7. In combination in a stooking machine, a supporting frame, a sheaf receiving basket mounted thereon, a carriage reciprocable on said frame, forward and rearward drive mechanism for operating said carriage, a stooker frame mounted in said carriage and movable vertically with relation thereto, means for delivering sheaves from said basket to said stooker frame, means for connecting the carriage to the rearward drive mechanism, means for lowering said stooker frame as it reaches the limit of its rearward travel, means for returning the carriage, a lever and stop arranged for contact when the carriage reaches the sheaf receiving position, thereby closing the movable member of the stooker-frame, and a dog arranged to engage the said frame in this position, the said dog being doubly beveled in order that it may ride easily into engaging position and yield readily to the rearward pull on the carriage.

8. In combination in a stooking machine, a supporting frame, a sheaf receiving basket mounted thereon, a carriage reciprocable on said frame, forward and rearward drive mechanism for operating said carriage, a stooker frame comprising a fixed member vertically movable relatively to said carriage and a member movably connected to said fixed member, means for delivering sheaves from said basket to said stooker frame, means for connecting said carriage to the rearward drive mechanism comprising a cord under tension arranged in the said frame, to be acted on by the sheaves as they are received, a spring-held part connected to said cord to be pulled into operative position when the reception of all the sheaves of a stook supplies adequate pressure, and means governed by the said spring-held part, whereby the rearward driving means for moving the carriage and stook-forming frame into stook depositing position may be brought into action, means for automatically lowering said stooker frame as it reaches the rearward limit of its travel, and means for returning said carriage.

9. In combination in a stooking machine, a supporting frame, a sheaf receiving basket thereon, a carriage reciprocable on said frame, forward and rearward drive mechanism for operating said carriage, a stooker frame in said carriage, means for delivering sheaves from said basket to said stooker frame, means for connecting said carriage to said rearward drive mechanism comprising a cord under tension within said frame arranged to be acted on by the sheaves as they are received, a spring-held part connected to said cord to be pulled into operative position when the completion of the stook supplies adequate pressure and means governed by said spring-held part whereby the rearward driving means for moving the carriage and stook-forming frame into stook-depositing position may be brought into action, means for automatically lowering said stooker frame as it reaches the rearward limit of its travel, means for swinging said movable member to open position as the carriage reaches the rearward limit of its travel, and means for returning said carriage.

10. In combination in a stooking machine, a supporting frame, a sheaf receiving basket mounted thereon, a carriage reciprocable on said frame, forward and rearward drive mechanism for operating said carriage, a stooker frame in said carriage and comprising a fixed member vertically movable relatively to said carriage and a member movably connected to said fixed member, means for delivering sheaves from said basket to said stooker frame, means for connecting said carriage to the rearward drive mechanism, means for automatically lowering said stooker frame as it reaches the rearward limit of its travel, means for swinging said movable member to open position as the carriage reaches the rearward limit of its travel, means for returning said carriage, and means for swinging said movable member to closed position as the carriage reaches the limit of its forward travel.

11. In combination in a stooking machine, a supporting frame, a sheaf receiving basket mounted thereon, a carriage reciprocable on said frame, forward and rearward drive mechanism for operating said carriage, a stooker frame in said carriage, means for delivering sheaves from said basket to said stooker frame, means for connecting said carriage to the rearward drive mechanism comprising a cord under tension acted on by the sheaves received within said stooker frame, a part arranged to be pulled into operative position by said cord as the frame is filled and means governed by said part for bringing into action the rearward driving mechanism to move said frame into stook-depositing position, means for automatically lowering said stooker frame as it reaches the rearward limit of its travel, means for returning said carriage, and means for securing said carriage in its forward position.

12. In combination in a stooking machine, a supporting frame, a sheaf receiving basket mounted thereon, a carriage reciprocable on said frame, forward and rearward drive mechanism for operating said carriage, a stooker frame in said carriage, means for delivering sheaves from said basket to said stooker frame, means for connecting said carriage to the rearward drive mechanism, means for automatically lowering said stooker frame as it reaches the rearward limit of its travel, means for returning said carriage, said means comprising a clutch-shifting lever, a spring acting thereon, a catch holding said lever in position for adjustment for the carriage returning movement and a cord connecting said carriage and said lever and arranged to draw upon and free the latter, and means actuated by said carriage and adapted to disconnect the driving mechanism as the said carriage reaches the limit of its forward travel.

13. In combination in a stooking machine, a supporting frame, a sheaf receiving basket mounted thereon, a carriage reciprocable on said frame, forward and rearward drive mechanism for operating said carriage, a stooker frame mounted in said carriage and comprising a fixed member vertically movable relatively to said carriage and a member movably connected to said fixed member, means for delivering sheaves from said basket to said stooker frame, means for connecting said carriage to the rearward drive mechanism, means for automatically lowering said stooker frame as it reaches the rearward limit of its travel, means for returning said carriage, means for securing said carriage in its forward position, means for releasing said securing means, and means for automatically opening said movable member of the frame while leaving said fixed member undisturbed after reaching the rearward limit of movement of such carriage and after the lowering of said stooker frame.

14. In combination in a stooking machine, a supporting frame, a sheaf receiving basket carried thereon, a carriage reciprocable on said frame, forward and rearward drive mechanism for operating said carriage, a stooker frame in said carriage and comprising a fixed member vertically movable relatively to said carriage and a member movably connected to said fixed member, means for delivering sheaves from said basket to said stooker frame, means for connecting said carraige to the rearward drive mechanism, comprising a cord arranged under tension within said stooker-frame to be operated by the completion of the stook, and clutch shifting devices controlled by the pull of said cord, means for automatically lowering said stooker frame as it reaches the rearward limit of its travel, means for returning said carriage, means actuated by said carriage and adapted to disconnect the driving mechanism as said carriage reaches the limit of its forward travel, and means for returning the driving mechanism to inoperative position.

15. In combination in a stooking machine, a supporting frame, a sheaf receiving basket mounted thereon, a carriage reciprocable on said frame, forward and rearward drive mechanism for operating said carriage, a stooker frame in said carriage and comprising a fixed member vertically movable relatively to said carriage and a member connected to said fixed member, means for delivering sheaves from said basket to said stooker frame, means for connecting said carriage to the rearward drive mechanism, means for automatically lowering said stooker frame as it reaches the rearward limit of its travel, means for automatically opening said movable member to discharge said sheaves after such lowering, means for returning said carriage, means actuated by said carriage and adapted to disconnect the driving mechanism as said carriage reaches the forward limit of its travel, a stop and arm arranged for engagement to close said movable member, thereby restoring the frame to stook-receiving condition, means for retaining the driving mechanism in inoperative position, and means for automatically moving the driving mechanism to operative position as the stook is completed.

16. In combination in a stooking machine, a reciprocable carriage, means for reciprocating the same, a stooker frame member flexibly connected thereto and adapted to move vertically relatively to said carriage, a swinging frame member pivoted to the first frame member and provided with an opening, and a flexible compressor secured to the first frame member, extended through the slot of the second, and yieldingly secured to the second frame member.

17. In combination in a stooking machine, a reciprocable carriage, means for reciprocating the same, a stooker frame member flexibly connected thereto and adapted to move vertically relatively to said carriage, a swinging frame member pivoted to the first frame member and provided with an opening, a flexible compressor secured to the first frame member, extended through the opening of the second, and yieldingly secured to the second, and means for maintaining said compressor under tension.

18. In combination in a stooking machine, a reciprocable carriage, means for reciprocating the same, a stooker frame member flexibly connected thereto and adapted to move vertically relatively to said carriage, a swinging frame member pivoted to the first frame member and provided with an opening, a flexible compressor secured to the first frame member, extended through the opening of the second, and yieldingly secured to the second frame member, means for maintaining said compressor under tension, and means for counteracting said tension means.

19. In combination in a stooking machine, a reciprocable carriage, means for reciprocating the same, a stooker frame member flexibly connected thereto and adapted to move vertically relatively to said carriage, a swinging frame member pivoted to the first frame member and provided with an opening, a flexible compressor secured to the first frame member, passed through the opening of the second, and yieldingly secured to the second frame member, means for maintaining said compressor under tension, means for counteracting said tension means, and means for automatically releasing said counteracting means.

20. In combination in a stooking machine, a reciprocable carriage, means for reciprocating the same, a stooker frame member flexibly connected thereto and adapted to move vertically relatively to said carriage, a swinging frame member pivoted to the first frame member and provided with an opening, a flexible compressor secured to the first frame member, extended through the opening of the second, and yieldingly secured to the second frame member, means for maintaining said compressor under tension, a brake lever counteracting said tension means, means for operating said brake lever, and means for automatically tripping said brake lever.

21. In a stooking machine, a stook-forming frame composed of a fixed member and a movable member adapted to leave between their ends an entrance opening, in combination with means for supplying sheaves to said frame through said opening, a compressor band within said frame normally under spring-tension and extending across said opening but adapted to yield to the inward pressure of the sheaves as fed, and means for automatically freeing said band from spring tension when the said frame is fully supplied with sheaves for a stook.

22. In a stooking machine, a yielding stook-forming frame adapted to have a sheaf-receiving opening, in combination with a compressor band arranged within said frame behind said opening, means for keeping said band under tension to hold the sheaves together in position for a stook, and means for freeing said band from tension when said frame is fully supplied.

23. In a stooking machine, a yielding stook-forming frame adapted to have a sheaf-receiving opening in combination with a compressor band under tension within said frame and adapted to yield to said sheaves and hold them, and means actuated by said frame to free said band from tension when said frame is fully supplied with sheaves to form a stook.

24. In a stooking machine, a stook-forming frame, reciprocating in its travel between the point of sheaf-reception and the point of stook discharge, in combination with a cord under tension within said frame and arranged to be acted on by the entering sheaves, a movable part connected to said cord, a spring bearing on said part to resist the pull of said cord, but arranged to yield when the stook is complete, and devices governed by the movement of said part for shifting the operative connection to the rearward driving mechanism.

25. In a stooking machine, a stooker-frame, in combination with a compression band normally under tension arranged within said frame for compressing the sheaves, and means for relieving said band from tension at a certain time.

Signed at Keddleston, Saskatchewan, Canada, this 22 day of August, 1917.

DAVID BUSHBY.

Copies of this patent may be obtained for five cents each, by addressing the "Commissioner of Patents, Washington, D. C."